June 24, 1924.

H. A. ALHEIT

JACK

Filed Oct. 31, 1923

1,499,280

WITNESSES

INVENTOR
HENRY A. ALHEIT
BY
ATTORNEYS

Patented June 24, 1924.

1,499,280

UNITED STATES PATENT OFFICE.

HENRY ADAM ALHEIT, OF BOSTON, MASSACHUSETTS.

JACK.

Application filed October 31, 1923. Serial No. 671,923.

*To all whom it may concern:*

Be it known that I, HENRY A. ALHEIT, a citizen of the United States, and a resident of Boston, in the county of Suffolk and State of Massachusetts, have invented a new and Improved Jack, of which the following is a full, clear, and exact description.

This invention relates to jacks and has for an object to provide an improved jack which is of very simple construction but which presents an extremely strong and efficient structure with a minimum number of parts.

Another object of the invention is to provide a jack wherein an adjustment of height may be made but without the use of elevating mechanism.

A still further object, more specifically, is to provide a jack wherein the parts are so arranged that the effective height of the jack may be provided and then the jack moved to operative position by power transmitted from the automobile or other vehicle with which the jack is being used.

An additional object is to provide a jack in which a specially constructed base is provided permitting the jack to be tilted and fitted against an object to be elevated and then swung with the object until the jack assumes a vertical position.

In the accompanying drawing—

Figure 1:
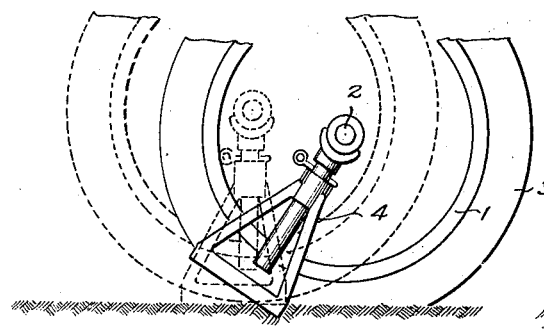
Figure 1 is a fragmentary view of a wheel and an axle of an automobile with the jack embodying the invention shown applied thereto.
Figure 2:
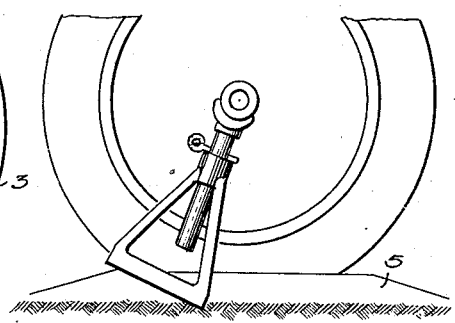
Figure 2 is a view similar to Figure 1 but showing the wheel mounted on a compensating block.

Referring to the accompanying drawing by numerals, 1 indicates the wheel of an automobile which is connected in any desired manner to the axle 2. When the tire 3 is deflated or it is desired for any reason to raise the axle 2, the jack 4 is placed against the axle as shown in Figure 1 and then the axle and wheel moved until the jack and other parts assume the dotted position shown in Figure 1. This may be done by manually pushing the automobile the desired distance or may be done by moving the automobile through the action of the engine and driving wheels.

Where the tire is deflated and is a very large tire, it is desirable to use a compensating block 5 which may be two or more inches thick. When this block is used, the wheel is moved by the power of the engine until it is positioned substantially as shown in Figure 2. The jack 4 is then placed in position and the engine caused to move the automobile in a proper direction which will in turn cause the parts to assume a position similar to that shown in dotted lines in Figure 1. Where the jack is being applied to the driving wheels, as for instance, the rear wheels of an automobile, the amount of raise is limited by the fact that the traction of the wheels ceases as soon as most of the weight is taken from either wheel. For this reason, it is desired to use a proper size block 5 to secure an initial elevation and then to use the jack 4 to secure the added elevation. After the jack 4 has provided the final or added elevation, block 5 may be removed and the tire operated on as desired.

Figure 3:
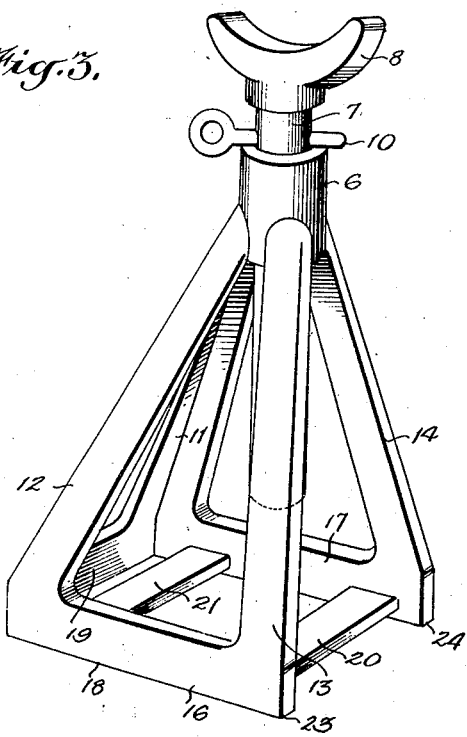
Figure 3 is a perspective view on an enlarged scale of the jack shown in Figure 1.
Figure 4:
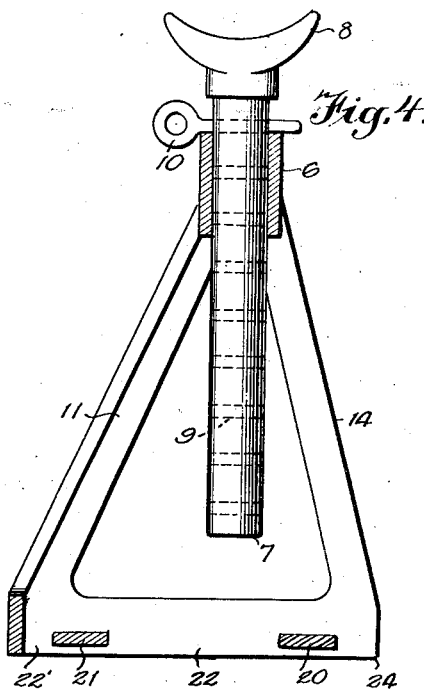
Figure 4 is a longitudinal vertical sectional view through the jack shown in Figure 3.

In Figures 3 and 4, the details of the jack 4 will be seen. In forming the jack, a tubular body 6 is provided designed to receive the adjustable stem 7 which carries at its upper end an arc-shaped shoulder 8 adapted to fit against the axle of an automobile or any other article to be elevated. The stem 7 is provided with a number of apertures 9 designed to receive at different times pin 10 whereby the effective height of the jack may be varied. The tubular body 6 merges preferably into four supporting legs 11, 12, 13 and 14. The legs 13 and 14 merge into the side bars 16 and 17 of the base 18. The side bars 16 and 17 in turn merge into the back bar 19 and into the legs 11 and 12. It will be noted that the front legs 13 and 14 are substantially rectangular in cross-section while the legs 11 and 12 are L-shaped. A pair of bottom plates or bars 20 and 21 are provided and form part of the base, said bars being preferably integral with the side plates 16 and 17, although this is not absolutely essential, as a rigid connection would serve the same purpose. From Fig. 4 it will be noted that the bars 20 and 21 are spaced a short distance from the bottom edge of the respective plates 16 and 17 and that there is a large opening 22 between these bottom plates. This construction permits the side plates 16 and 17 to sink slightly into the roadbed before the plates 20 and 21 engage the roadbed. This will prevent any tilting and at the same time the opening 22 and the opening 22' will permit the entrance of part of the roadbed or other support when the weight of the automobile is on the jack and thereby prevent accidental slipping or sliding of the jack.

In Fig. 3 it will be noted that the side bars 16 and 17 are parallel or substantially parallel and consequently a proper shaping of the base is produced which is ample to support the desired weight and at the same time permit the structure to be sufficiently small to fit in a tool-box or other place of storage. It will also be noted from Figs. 3 and 4 that the side bars or members 16 and 17 present spurs or earth-engaging corners 23 and 24, which are adapted to dig into the roadbed as shown in Figs. 1 and 2 when the jack is being operated.

It will be noted from Figure 4 that the corners 23 and 24 are only a short distance in front of a central line drawn through the stem 7. This will permit the jack to be readily tilted over from the position shown in Figure 1 to the dotted position shown in the same figure, but will resist further tilting as the base 18 extends an appreciable distance beyond the stem 7 on the side opposite that carrying the spurs 23 and 24. Preferably the parts, except members 7 and 10, are formed integral or welded together at the point of connection so that the complete structure will be extremely strong as well as presenting a minimum number of parts. It will be noted that there are only three independent parts, namely, the stem structure 7, pin 10 and the remaining members forming the jack.

What I claim is:—

1. A jack, comprising a substantially rectangular base formed with three side plates, a back bottom plate connecting three of said plates, a front plate connecting two of said side plates, two of said side plates being formed at one end with spurs, a body mounted on said base, and adjustable means carried by the body for varying the effective height of the jack.

2. In a jack of the character described, a tubular body merging into a plurality of depending legs and a base connected with said legs, said base being formed substantially rectangular with a pair of side plates and a connecting back plate, said side plates being also provided with a front and rear connecting bottom plate.

3. In a jack, a tubular body merging into a plurality of depending legs, a plate connecting each pair of legs together at the bottom, a back plate connecting said first mentioned plates together, and a pair of bottom plates connecting the first mentioned plates together, said bottom plates being spaced apart and above the bottom edge of said bottom plates.

4. In a jack, a tubular body merging into a plurality of depending legs, a base merging into said legs, said base including a pair of side plates, and a pair of spaced bottom plates, said bottom plates being also spaced upwardly from the bottom edge of said side plates.

HENRY ADAM ALHEIT.